United States Patent

Templin

[15] 3,649,031

[45] Mar. 14, 1972

[54] TONE ARM ASSEMBLY

[72] Inventor: Lee H. Templin, Elgin, Ill.

[73] Assignee: Borg-Warner Corporation, Chicago, Ill.

[22] Filed: Feb. 2, 1970

[21] Appl. No.: 7,667

[52] U.S. Cl. ....................274/23 R

[51] Int. Cl. ....................G11b 17/06

[58] Field of Search ....................274/23, 13–15, 274/1.11

[56] References Cited

UNITED STATES PATENTS 2,953,383 9/1960 Walters....................274/15

*Primary Examiner*—Harry N. Haroian

*Attorney*—Donald W. Banner, William S. McCurry and John W. Butcher

[57] ABSTRACT

A pickup arm or tone arm assembly is constructed in a manner which permits limited lateral movement of the stylus while maintaining the position of the tone arm base fixed. An articulated linkage between the base and the stylus includes a locator which repositions the stylus with respect to the base each time that the base is lifted to retract the stylus from engagement with the record.

4 Claims, 4 Drawing Figures

Patented March 14, 1972 3,649,031

INVENTOR
LEE H. TEMPLIN

BY Thomas B. Hunter
ATTORNEY

TONE ARM ASSEMBLY

BACKGROUND AND SUMMARY OF THE INVENTION

This invention relates generally to phonographic apparatus and, more particularly, to a tone arm assembly which has special utility in an audiovisual device employing a disk-type phonograph record for the audio component.

The present invention may be considered as an improvement on the audiovisual apparatus described in U.S. Pat. No. 3,483,633 issued to A. E. Geils et al. on Dec. 16, 1969. This apparatus utilizes an audio record having a plurality of messages recorded in spaced, generally concentric bands. Within each band, the messages are recorded so that they repeat during each revolution of the record. In other words, each band comprises a plurality of identical recorded messages which begin and end at points along a pair of imaginary radial lines extending from the center of the disk. Synchronization can be assured by dropping the stylus at any point within a particular band, thus allowing some latitude in the positioning of the tone arm.

Synchronization between the tone arm position and the visual display is maintained by means of a mechanical connection which assures that there is a single position of the tone arm for each position of the film holder.

Accordingly, the tone arm is not free to move laterally with respect to the record once the selected message band has been located and the tone arm dropped to bring the stylus into location with the message in said band. This presents somewhat of a problem in that within the single revolution, the spiral recording path, plus runout common to most pressings, brings some lateral pressure to bear on the stylus. If the stylus is immovable relative to the tone arm during this revolution, the audio reproduction is distorted because the stylus does not rest in the recording groove with uniform pressure on both sides of the channel. On the other hand, if the stylus is free to float, the position of the stylus with respect to the tone arm cannot be held within precise limits. When a floating stylus is withdrawn from the record to prepare for the next message, it is possible for the stylus to be far enough from its normal position relative to the tone arm to be dropped in the wrong band, thus putting the system out of synchronization.

Another problem for which the present invention proposes a solution is that of audio feedback to the cartridge. In a rigid tone arm assembly, mechanical vibrations from the speaker may excite the cartridge resulting in a loud, annoying howling noise in the speaker. In the floating tone arm assembly of the present invention, a resilient grommet in the tone arm isolates the cartridge sufficiently to eliminate this feedback problem.

In the present invention, there is connected to the tone arm base an extension which carries the stylus and which is free to float within predetermined limits. However, the tone arm includes a locating device which automatically centers the extension with respect to the tone arm base. This effects precise alignment each time the stylus is picked off the record so that the next time the stylus is dropped, after repositioning of the tone arm base, it is brought into contact with the correct band.

It is, therefore, a principal object of the invention to provide an improved tone arm assembly having a cartridge stylus to permit floating action of the stylus relative to the pivot point of the tone arm assembly.

Another object of the invention is to provide a tone arm assembly which automatically aligns the stylus with respect to a predetermined radial extending from the pivot point of the tone arm assembly to assure that the stylus is dropped into the correct record band.

Another object of the invention is to provide a tone arm assembly suitable for use in an audiovisual apparatus which maintains synchronization between the audio and visual presentations, while permitting floating action of the stylus to assure quality audio reproduction.

Another object of the invention is to provide a tone arm assembly in which the cartridge is substantially isolated from the frame, whereby vibrations from the speaker cannot excite the cartridge. This substantially eliminates the audio feedback to the cartridge.

Still another object of the invention is to provide a tone arm assembly in which the low mass of a floating arm improves audio fidelity and tracking ability.

Additional objects and advantages will be apparent from reading the following detailed description taken in conjunction with the drawings.

THE DRAWINGS

DETAILED DESCRIPTION OF THE INVENTION

Figures 1, 2, 3, 4:
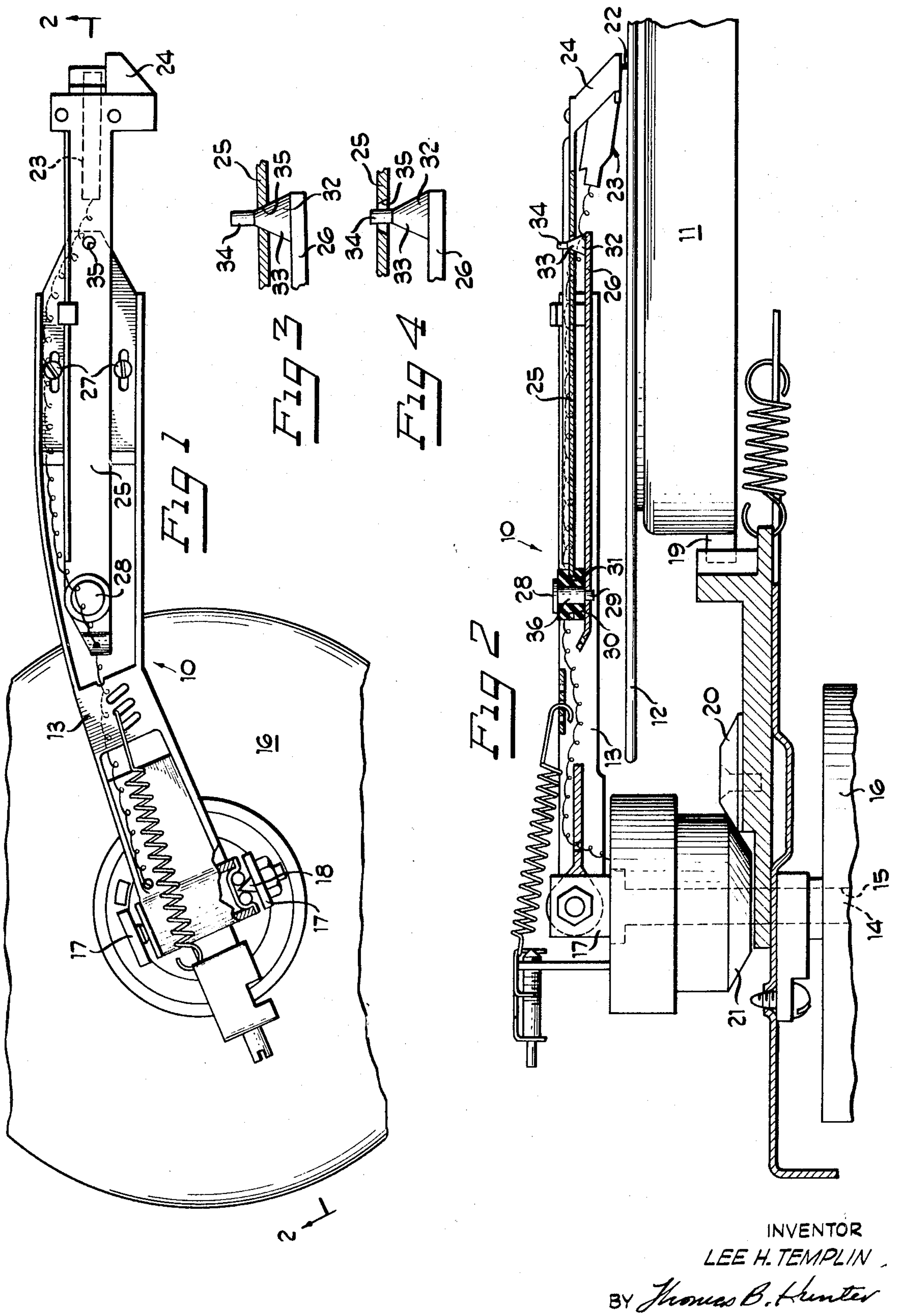
FIG. 1 is a top plan view of a tone arm assembly constructed in accordance with the principles of the present invention.
FIG. 2 is a cross-sectional view taken along the plane of line 2—2 of FIG. 1.
FIG. 3 is a detailed cross-sectional view illustrating the position of the tone arm locator when the stylus is withdrawn from engagement with the record.
FIG. 4 is a view similar to FIG. 3 illustrating the tone arm locator in a position with the stylus in engagement with the record.

Referring first to FIGS. 1 and 2, there is shown a tone arm assembly 10 oriented in operational relationship with a turntable 11 adapted to receive a record 12 placed on a spindle (not shown).

The tone arm assembly 10 is constructed in two primary sections. The first is a base or pivot assembly 13 which is suspended for lateral movement on a vertical pinion 14 journaled in a bearing 15 provided in a fixed support or base member 16. The base member 16, of course, is fixed within the same frame as that which supports the turntable 11. The pinion 14 is fabricated with a yoke 17 at the upper portion thereof supporting a pair of bearings 18, one of which is shown in FIG. 1, and which hold the tone arm base assembly 13 and permit it to pivot in a vertical direction.

A lifting mechanism, the details of which are more particularly described in the aforementioned U.S. Pat. No. 3,483,633 comprises a camming device operated by a projection 19 on the turntable 11 which forces a conically shaped cam 20 against a complementary surface 21 carried by the pinion 14. When the turntable 11 has rotated to a particular position, the projection 19 forces the cam 20 to lift the pinion 14 and the yoke 17 in a vertical direction, an amount sufficient to lift the tone arm assembly 10, and a stylus 22 carried thereby, off the record.

A cartridge and stylus assembly 23, which includes the stylus 22, is carried in a holder 24 at one end of a tone arm extension 25 which forms the second primary section of the tone arm assembly 10. The extension 25 is secured to a slidable plate 26 which is held on a lower surface of the tone arm base assembly 13 and which is adjustable by means of adjustment screws 27 which secure the plate 26 to the base assembly 13.

The tone arm extension 25 is mounted for limited vertical and lateral movement on a shoulder rivet 28 secured to the plate 26 at its lower end 29 and received in a grommet 30 carried in an opening 31 at the opposite end of the tone arm extension 25. Some clearance may be provided between the grommet 30 and the shoulder 32 of the rivet 28 which is sufficient to allow approximately one-eighth of an inch vertical movement of the terminal portion of the extension 25 carrying the cartridge and stylus assembly 23. This grommet functions also to provide isolation (damping) of the tone arm extension from mechanical vibrations transmitted through the tone arm base which adversely affects audio quality. On the other hand, such clearance may not be necessary and the grommet may actually be squeezed under the head of the shoulder rivet 28. However, the grommet 30 is preferably constructed of very soft rubber which is sufficient to give the necessary flexibility and vibration isolation.

An improvement aspect of the present invention is the provision of a locator for the tone arm extension 25 with respect to the tone arm base assembly 13. This locator includes a pin 32 located at the end of the slidable plate 26 and having a conically shaped base portion 33 and a cylindrical end portion 34. The end portion 34 extends through an oversized hole formed by a conical surface 35 in the tone arm extension 25 so that when the base assembly 13 is in a position to effect engagement of the stylus 22 on the record 12, the pin 32 has quite a bit of clearance within the hole formed by the surface 35 in the extension 25. This permits movement of the entire cartridge and stylus assembly 23 notwithstanding the fact that the base assembly 13 is rigidly held in a predetermined position relative to the record 12. This is best shown in FIG. 4, which shows the relative positions of the pin 32 and the tone arm extension 25, while the stylus 22 is in engagement with the record 12. Upon completion of one revolution of the turntable 11, the cam lifting mechanism causes the yoke 17 supporting the base assembly 13 to raise vertically approximately one-fourth of an inch and this will cause the tone arm base assembly 13 to engage the tone arm extension 25 at the locator as shown in FIG. 3. As soon as the surface 35 forming the hole in the extension 25 engages the conically shaped base portion 33 of the locator pin 32, the extension 25 will automatically be centered and moved to a predetermined position relative to the tone arm base assembly 13, even though the stylus may have caused the extension 25 to move slightly as the stylus 22 tracked in the record groove. With the locator effecting this realignment every time the tone arm assembly is lifted from the record 12, synchronization of the message bands with the visual presentation is automatically predetermined and the stylus will always drop into engagement with the correct message band.

While the invention has been described in connection with a certain specific embodiment thereof, it is to be understood that this is by way of illustration and not by way of limitation; and the scope of the appended claims should be construed as broadly as the prior art will permit.

What is claimed is:

1. A tone arm assembly for a phonograph apparatus, including a tone arm base means; a tone arm extension means mounted on the base means for movement relative thereto and adapted to carry a stylus, and locator means constructed to permit limited relative movement between the base means and the extension means when the stylus is engaged with a phonograph record disk, said locator means including a pin carried by one of said base means and said extension means, means defining a surface forming an opening in the other of said base means and said extension means, said pin extending into said opening and having an end portion and a base portion enlarged relative to the end portion, said opening being larger in cross section than said end portion, said surface forming said opening being adapted to engage said base portion in mating relationship.

2. A tone arm assembly for a phonograph apparatus, including a tone arm base means; a tone arm extension means adapted to carry a stylus and mounted on the base means for lateral movement relative thereto and for movement transverse to said lateral movement between two positions relative to the base means, one of said positions corresponding to the position of said extension means relative to the base means when the tone arm assembly is mounted in a phonograph apparatus and the stylus is in engagement with a phonograph record disk, the other of said positions corresponding to the position of said extension means relative to the base means when the tone arm assembly is mounted in a phonograph apparatus and the stylus is out of engagement with a phonograph record disk; and locator means on said base means and said extension means constructed to limit said relative lateral movement of said extension means when said extension means is in said one position and to prevent said relative lateral movement of said extension means when said extension means is in said other position, said locator means including a pin carried by one of said base means and said extension means, and a surface defining an opening in the other of said base means and said extension means, said pin extending into said opening and having an end portion and a base portion enlarged relative to the end portion, said opening being larger in cross section than said end portion, said surface forming said opening being adapted to engage said base portion in mating relationship.

3. A tone arm assembly according to claim 2, wherein said locator means comprises an opening in said extension means, and a pin mounted on said base means and extending into said opening, said pin having a frustoconical base portion and a cylindrical end portion joined to said base portion, said opening having a diameter larger than the diameter of said pin end portion and being defined by a frustoconical surface on said extension means adapted to mate with said pin base portion when said extension means is in said other position, said pin base portion and said frustoconical surface comprising camming surfaces adapted to locate said extension means in said central position during movement of said extension means from said one position to said other position.

4. A tone arm assembly adapted to carry a stylus and including a tone arm base means adapted to be mounted in a phonograph apparatus for pivotal movement relative to a turntable in a horizontal plane and for movement in a vertical plane between a lower position in which the stylus is in engagement with a phonograph record disk resting on the turntable and an upper position in which the stylus is out of engagement with the phonograph record disk, a tone arm extension means carried by the base means and having an outer end and an inner end, said extension means having stylus mounting means at said outer end thereof, pivot means at said inner end of said extension means interconnecting said base means and said extension means for movement of said extension means relative to said base means in a horizontal plane, said pivot means being formed to permit limited relative movement of said extension means relative to said base means in a vertical plane between a first position corresponding to said upper position and a second position corresponding to said lower position, and locator means comprising an opening in said extension means intermediate said ends thereof, and a pin mounted on said base means and extending into said opening, said pin having a frustoconical base portion and a cylindrical upper portion joined to said base portion, said opening having a diameter greater than the diameter of the upper pin portion and being defined by a frustoconical surface on said extension means, said surface being adapted to surround said upper pin portion when said extension means is in said second position whereby to limit movement of said extension means relative to said base means in a horizontal plane, said surface being adapted to mate with said pin base portion when said extension means is in said first position whereby to prevent movement of said extension means relative to said base means in a horizontal plane, said pin base portion and said surface comprising cam surfaces adapted to locate the extension means in a predetermined position in a horizontal plane relative to the base means during movement of said extension means from said second position to said first position.

* * * * *